United States Patent [19]
Brown

[11] Patent Number: 4,555,011
[45] Date of Patent: Nov. 26, 1985

[54] CONVEYING ROD-LIKE ARTICLES
[75] Inventor: Anthony R. Brown, Milton Keynes, England
[73] Assignee: Molins PLC, London, England
[21] Appl. No.: 517,408
[22] Filed: Jul. 26, 1983
[30] Foreign Application Priority Data Jul. 29, 1982 [GB] United Kingdom ............... 8221951

[51] Int. Cl.⁴ ............................................. B65G 43/00
[52] U.S. Cl. .................................. 198/444; 198/524; 198/572
[58] Field of Search ............... 198/347, 524, 444, 572, 198/573; 53/503, 493; 131/282, 283, DIG. 909

[56] References Cited
U.S. PATENT DOCUMENTS

| 2,997,828 | 8/1961 | Ahlbor | 198/347 |
| 3,509,986 | 5/1970 | Focke | 198/347 |
| 3,799,324 | 3/1974 | Hall | 198/847 |
| 4,200,181 | 4/1980 | Clarke | 198/572 |

OTHER PUBLICATIONS

Research Disclosure 17502, Conveying Apparatus, Nov. 1978.

Primary Examiner—Joseph E. Valenza
Assistant Examiner—Kyle E. Shane
Attorney, Agent, or Firm—Antonelli, Terry & Wands

[57] ABSTRACT

A flexible membrane (54) confines the rod-like articles in a transition zone (10) (which may be the filling head of a tray filler). The membrane is extended or retracted under tension in response to pressure of articles in the zone. The amount of extension or retraction is used to generate a signal which controls a conveyor (18) feeding articles to the zone (10) or a conveyor (38) taking articles away from the zone (e.g. in trays 36). The signal may be generated by a rotary potentiometer (64) rotatable with a spiral spring (62) to which the membrane (54) is connected.

26 Claims, 1 Drawing Figure

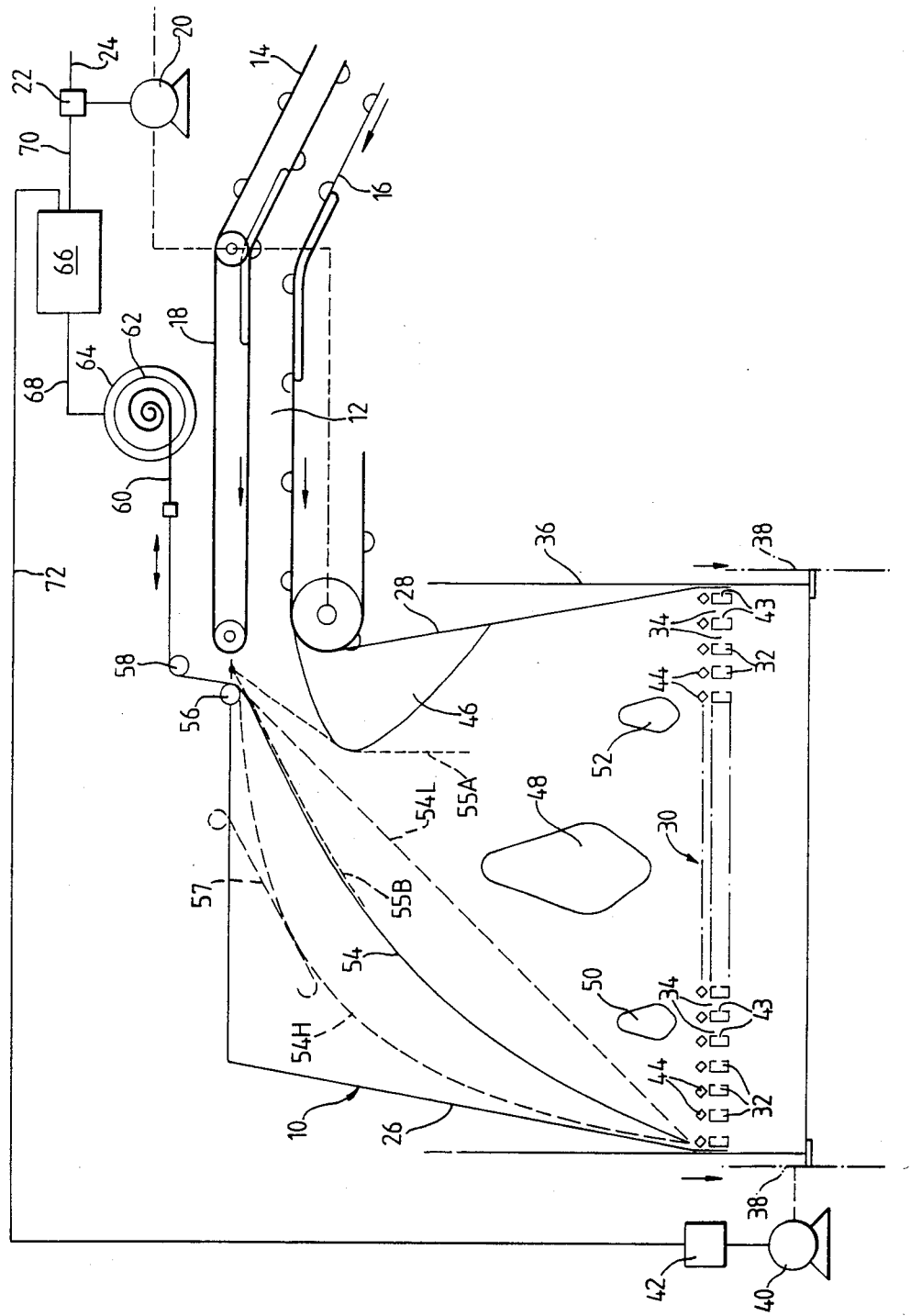

CONVEYING ROD-LIKE ARTICLES

This invention relates to conveying rod-like articles, particularly cigarettes, cigarette filter rods or other articles of the tobacco industry.

In the manufacture and subsequent processing of cigarettes or similar rod-like articles the articles are commonly conveyed between successive processing stages as a multi-layer stream. It is known to control the movement of this stream by sensing the pressure or quantity of articles in the stream at a critical position, typically at a junction. Known sensors for this purpose include various forms of pivoted levers which rest on the articles at a junction and respond to a build up of articles by controlling flow of articles to or from the junction. The lever can rest on the articles directly or on a flexible membrane confining the articles. One arrangement of this type is disclosed in British patent specification No. 1,372,148. Another known type of sensor includes a moving sensor band partly defining a junction zone and capable of flexing outwards under the pressure of articles in the zone, monitoring means being provided to detect the outward flexing of the band and for controlling feed of articles to or from the junction zone.

The present invention provides a conveyor system for rod-like articles including at least one conveyor from moving articles in stack formation to or from a transition zone, a flexible membrane at least partly confining the articles at the transition zone, means for extending and retracting the membrane under tension in response to pressure of articles in the transition zone, detector means responsive to the longitudinal position of the membrane, and means for controlling said conveyor in response to signals from the detector means. Preferably the detector means is responsive to the amount of extension or retraction of the membrane.

In a preferred arrangement one end of the membrane is fixed and the other end is connected to part of the detector means. For example, the moving end of the membrane may be attached to a spiral spring normally wound around a rotor. Extension of the membrane (due to pressure of articles in the transition zone) extends the spring and rotates the rotor. The detector means may include a rotary potentiometer or the like connected to the rotor. The spiral spring links the end of the membrane to the rotor and potentiometer and also maintains the membrane under tension.

In a preferred conveyor system the transition zone comprises a junction zone. The zone may comprise a conventional T or other junction between endless band conveyors for multi-layer streams of articles or may comprise a filling head or hopper or other magazine to which one such conveyor delivers articles and from which the articles are delivered into a tray or into a packing machine.

The invention will be further described, by way of example only, with reference to the accompanying diagrammatic drawing, which shows a tray filling unit.

The unit comprises a filling head 10 which is supplied with a stream 12 of rod-like articles in multi-layer stack formation. The articles could, for example, be cigarettes delivered directly from a cigarette making machine, or filler rods delivered from a filter making machine. The stream 12 is advanced by conveyors 14, 16 and 18 driven at a common speed by way of a motor 20. The speed of the motor 20 is controlled by a unit 22 which has an input line 24 leading from the upstream producing machine (e.g. the cigarette or filter making machine) so that the speed of conveyors 14, 16 and 18 is normally matched to the output of the producing machine.

The filling head 10 includes side walls 26, 28 which are slightly inclined to the vertical. The stream 12 is delivered from the ends of the conveyors 16, 18 to the upper part of the filling head 10 above the wall 28. At the lower end of the filling head 10 a shutoff mechanism 30 extends between the walls 26, 28. The mechanism 30 includes spaced members 32 defining between them channels 34. The channels 34 are wide enough to allow passage of articles from the filling head 10 into a tray 36 which fits around the filling head and which may be progressively lowered by chain conveyors 38 driven by a motor 40 under control of a unit 42. Each of the passages 34 is associated with a side wall of a member 32 which wall includes a suction aperture 43. Non-cylindrical agitator rollers 44 are arranged above each of the members 32.

A tray 36 to be filled with articles from the filling head 10 is placed around the filling head with its bottom just beneath the mechanism 30. The agitator rollers 44 are oscillated to aid passage of rod-like articles through the channels 34 and into the tray 36, which is lowered by the chains 38 at a rate which approximately corresponds to the rate of supply of articles in the stream 12. When it is required to stop flow of articles from the filling head (e.g. for tray changing when the tray 36 is full) the agitator rollers 44 are stopped and suction is applied to each of the apertures 43 so that a rod-like article is held against the side of the corresponding member 32 and the associated channel 34 is blocked. The mechanism 30 and its operation is similar to that used in the Molins MK16 tray filling unit and as described in British patent specification No. 1,186,348, to which reference is directed for further details.

The filling head 10 includes flow controllers 46, 48, 50 and 52 which not only partly control the direction and rate of flow of articles through the filling head but also relieve pressure on articles near the bottom of the head. When the filling head 10 is intended for use with filter cigarettes the flow controllers may have control surfaces which are inclined slightly (by about 3°-6°) to the horizontal in a vertical plane parallel to the articles, to compensate for the problem of tip build-up.

A flexible membrane 54 extends across the filling head 10 from an upper position adjacent the ends of conveyors 16, 18, to an approximately diagonally opposite lower position, adjacent the side wall 26 and the shut-off mechanism 30. The membrane 54 is anchored and fixed at its lower end position. At the upper end of the filling head 10 the membrane 54 passes around guides 56, 58 and is connected at its upper end to the end of a spiral spring 60 connected to and normally housed in a rotor 62. The spring 60 is stressed so that it naturally wraps around the core of the rotor 62 and applies constant tension to the membrane 54 as it is unwound; it also rotates the rotor 62 by a predictable amount as it is unwound. The rotor 62 is connected to a rotary potentiometer 64 or other device capable of providing an output which varies predictably with the rotational position of the rotor 62.

When there are no or few rod-like articles in the filling head 10 the spring 60 maintains the membrane 54 in the position 54L indicated by dotted lines in the drawing. In this position the space between the membrane 54 and the flow controller 46 is relatively small so that the flow of articles into the filling head 10 is restricted. A typical position for the membrane 54 when the filling head 10 is in operation and filling a tray 36 is shown by the full line in the drawing. During a tray change or otherwise when articles are delivered by the stream 12 at a rate faster than they are flowing through the channels the quantity of articles in the filling head increases so that the membrane 54 may be extended to a position such as that indicated by the dotted line 54H. The part of the filling head 10 between the normal or median position of the membrane 54 and the line 54H (and beyond) constitutes a reservoir capacity which is required for each tray changing operation (so that feed of the stream 12 need not be stopped).

The position of the membrane 54 determines the extension of spring 60 and hence the rotational position of the rotor 62 and potentiometer 64. A control circuit 66 responds to a signal corresponding to that position which is available on a line 68 and may apply a corresponding signal to a line 70 leading to the control unit 22 for the motor 20. If, for example, the membrane reaches an upper limit position (beyond 54H) the control circuit 66 may apply a signal to the unit 22 to stop the motor 20. As previously mentioned, the speed of conveyors 14, 16, 18 is normally set by the speed of the upstream producing machine, so that the speed of motor 20 is also controlled through line 24. Instead of using a separate motor 20, therefore, the drive to the conveyors 14, 16, 18 may be taken directly from the drive of the upstream machine, the motor 20 being replaced by a disengagable drive mechanism such as a clutch. A signal from the control circuit 66 to stop the motor 20 would, in that case, be used to disengage the drive. The signal on line 68 may be used to control or modify the speed of motor 20 proportionally or otherwise progressively depending on the rotational position of rotor 62 and potentiometer 64.

If during normal operation of the filling head 10 the membrane 54 falls below its normal operating range and approaches the position of the line 54L, this would be detected by the corresponding rotational position of the rotor 62 and potentiometer 64 and the control circuit 66 may pass a signal through a line 72 to the control unit 42 for the tray conveyor motor 40, so as to slow or, in an extreme case, stop the movement of the tray conveyor 38. The signal on line 72, which depends on that on line 68, may be used to modify the speed of motor 40 proportionally otherwise progressively depending on the rotational position of the rotor 62 and potentiometer 64. More generally, the control circuit 66 may be used to monitor the position of the membrane 54 so as to ensure that the motor 40 is driven at such speed that at the end of each tray filling operation sufficient reservoir capacity is available within the filling head to enable a tray change to take place without stopping the flow of articles into the filling head by way of the stream 12. Similarly the control circuit 66 could be arranged to ensure that the motor 20 and/or the motor 40 are controlled such that the reservoir capacity is within predetermined limits at any stage in the tray filling cycle. It is possible, therefore, for the motors 20 and 40 to be controlled by the circuit 66 such that the reservoir is progressively filled or emptied.

A flexible flap of relatively heavy material, e.g. chainmail, may be fixed at one end adjacent the roller 56 so that it extends downwardly into the filling head 10 and normally drapes over the flow controller 46, as indicated by the dotted line 55A in the drawing. This further controls the initial flow of articles into the filling head 10. During normal operation the flap is pressed against the membrane 54 by the articles in the filling head, as indicated by the dotted line 55B. Since the flap is heavier than the membrane 54 it tends to respond more quickly to rapid downward changes in level of articles in the filling head, such as can occur following a tray change, thereby avoiding the possibility of cavitation and the resultant risk of misaligned articles. A suitable material for the flap is that available under the brand name TISS-metal.

Instead of relying on the rotor 62 to provide an indication of the position of the membrane 54 a pivoted sensor lever resting on the membrane may be provided and the angular position of its spindle used to provide that indication in any convenient manner. The position of such a sensor lever when resting on the membrane at position 54H is indicated at 57 in the drawing.

I claim:

1. A conveyor system for rod-like articles, comprising at least one conveyor for moving articles in stack formation to or from a transition zone, a flexible membrane at least partly confining the articles at the transition zone, means for extending and retracting the membrane along a longitudinal path under tension including load-applying means movable in response to pressure of articles in the transition zone, detector means responsive to the longitudinal position of at least part of the membrane on said path for generating signals indicative of any longitudinal position of said membrane within a range of positions, and means for progressively controlling said conveyor in response to signals from the detector means.

2. A conveyor system according to claim 1, wherein the detector means is responsive to the amount of longitudinal extension or retraction of the membrane.

3. A conveyor system according to claim 1, wherein one end of the membrane is fixed and the other end is movable with part of the detector means.

4. A conveyor system according to claim 2, wherein said load applying means is arranged to apply substantially constant tension to the membrane.

5. A conveyor system according to claim 1, wherein said load-applying means includes a flat spirally-wound spring connected to said part of the membrane.

6. A conveyor system according to claim 1, wherein said detector means comprises means responsive to the angular position of a rotary member.

7. A conveyor system according to claim 6, wherein the rotary member is connected to a rotary potentiometer.

8. A conveyor system according to claim 1, wherein the transition zone includes a junction zone.

9. A conveyor system according to claim 8, wherein said conveyor is arranged to convey articles towards said junction zone, and a further conveyor is arranged to convey articles away from the junction zone.

10. A conveyor system according to claim 9, wherein said detector means is arranged to control said further conveyor.

11. A conveyor system according to claim 8, wherein the junction zone includes a magazine to which articles are delivered and from which they are removed for supply to a receiving device, the membrane extending across an upper part of the magazine.

12. A conveyor system according to claim 11, wherein the magazine comprises a filling head of a tray filler.

13. A conveyor system according to claim 12, further including tray conveying means for conveying trays at said filling head, and control means linking said detector means and said tray conveying means, so that movement of a tray by said tray conveying means may be controlled according to the position of said membrane.

14. A conveyor according to claim 1, wherein the membrane defines a variable capacity buffer reservoir at said transition zone, said controlling means being arranged to produce signals when said membrane reaches a retracted or an extended position indicating respectively a low capacity or a high capacity of articles in said reservoir.

15. A conveyor system according to claim 14, wherein one of said signals is effective to stop said conveyor.

16. A conveyor system according to claim 1, wherein the membrane defines a variable capacity buffer reservoir at said transition zone, said controlling means including means for monitoring signals from the detector means and for controlling the speed of said conveyor such that said reservoir is progressively filled or emptied as articles are conveyed towards or away from said transition zone, so that periodically a desired state of fill of the reservoir may be achieved.

17. A conveyor system according to claim 16, further including tray conveying means, said buffer reservoir including delivery means and said tray conveying means being arranged to convey a tray from a position at which articles may be received from said delivery means, wherein said controlling means includes means for controlling said tray conveying means according to the position of said membrane.

18. A conveyor system according to claim 16, wherein one end of said membrane is fixed to a point within said buffer reservoir and the other end of said membrane is movable with part of said detector means to which it is connected.

19. A conveyor system according to claim 1, wherein the load-applying means includes resilient means connected between said part of the membrane and said detector means.

20. A conveyor system according to claim 1, wherein said detector means is connected to said membrane so as to directly detect longitudinal movement of said membrane as it is extended and retracted by said articles.

21. A conveyor system for rod-like articles, comprising at least one conveyor for moving articles in stack formation to or from a transition zone, a flexible membrane at least partly confining the articles at the transition zone, means responsive to pressure of articles in the transition zone for extending and retracting the membrane along a longitudinal path, detector means responsive to the longitudinal position of part of the membrane on said path, and means for controlling said conveyor in response to signals from the detector means, wherein the path of said membrane is arranged to pass close to the surface of said conveyor to restrict and control passage of articles to or from the transition zone when the membrane is in a retracted position and to be further spaced from said conveyor surface to allow relatively unobstructed passage of articles to or from the transition zone when the membrane is in an extended position.

22. A conveyor system for rod-like articles, comprising at least one conveyor for moving articles in stack formation to or from a transition zone, a flexible membrane at least partly confining the articles at the transition zone, means for extending and retracting the membrane under tension in response to pressure of articles in the transition zone, detector means responsive to the longitudinal position of the membrane, and means for controlling said conveyor in response to signals from the detector means.

23. A conveyor system according to claim 22, wherein said detector means comprises means for detecting the angular position of a rotary member to which said membrane is coupled by way of said extending and retracting means and for generating signals representing said angular position.

24. A conveyor system according to claim 23, wherein said extending and retracting means comprises a spiral spring having one end connected to one end of the membrane and another end connected to said rotary member to effect rotation of said rotary member with longitudinal movement of said membrane.

25. A conveyor system for rod-like articles, comprising at least one conveyor for moving articles in stack formation to or from a transition zone, a flexible membrane at least partly confining the articles at the transition zone, means responsive to pressure of articles in the transition zone for extending and retracting the membrane under tension, detector means responsive to the longitudinal position of the membrane and including at least one movable member, resilient means connected between said movable member and said membrane for transmitting movement of said membrane to said movable member and for maintaining said membrane under tension, and means for controlling said conveyor in response to signals from the detector means.

26. A conveyor system according to claim 25, wherein said movable member is mounted for rotational movement about an axis, and said resilient means comprises a spirally-wound spring.

* * * * *